E. McLEOD.
TIGHTENER YOKE FOR FRICTION CLUTCH SEGMENTS.
APPLICATION FILED DEC. 4, 1919.
1,393,895.
Patented Oct. 18, 1921.
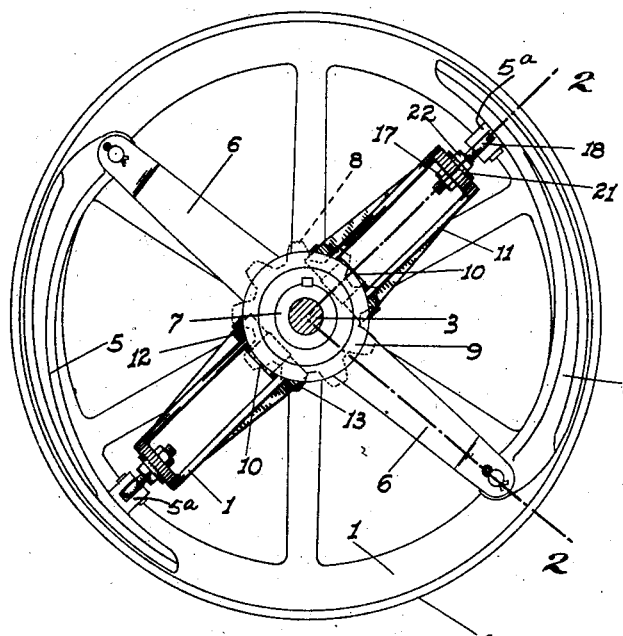
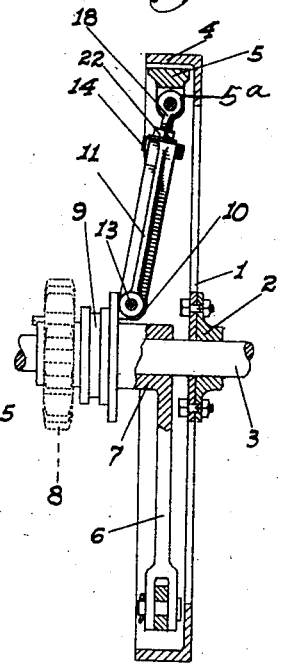
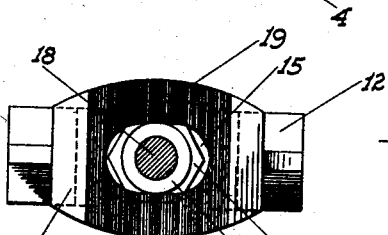
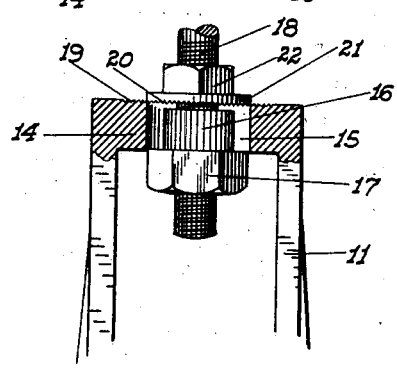
INVENTOR.
Edison McLeod
BY
ATTORNEY

UNITED STATES PATENT OFFICE.

EDISON McLEOD, OF BANTA, CALIFORNIA.

TIGHTENER-YOKE FOR FRICTION-CLUTCH SEGMENTS.

1,393,895. Specification of Letters Patent. Patented Oct. 18, 1921.

Application filed December 4, 1919. Serial No. 342,457.

*To all whom it may concern:*

Be it known that I, EDISON McLEOD, a citizen of the United States, residing at Banta, in the county of San Joaquin, State of California, have invented certain new and useful Improvements in Tightener-Yokes for Friction-Clutch Segments; and I do declare the following to be a full, clear, and exact description of the same, reference being had to the accompanying drawings, and to the characters of reference marked thereon, which form a part of this application.

This invention relates to improvements in friction clutches of the type having internal expanded friction segments, and particularly to the means of expanding or tightening such segments.

It is intended principally as an improvement over the type of expanding means used with and made as a part of the master friction clutches of the Holt type of tractors, which is substantially as shown in U. S. Patent No. 428,634, dated May 27, 1890.

The principal object of the invention is to provide a segment tightener-yoke operated in conjunction with the lever actuated friction slide, which will effectually maintain the slide in a true position of its sleeve or shaft, and which is so constructed that it will always remain radial with the friction wheel or drum.

I am also enabled to do away with the keys now used to position the friction slide on, and which are a constant source of trouble and annoyance.

These keys in time become worn, so that the slide can rock somewhat thereon. This feature throws the yokes as now constructed out of true radial alinement, and renders the actuating of the clutch a laborious and difficult matter, as there is a torsional straining of the parts which tends to bind the same when being moved.

With my improved yoke, this defect is eliminated, and the clutch can always be actuated freely and easily. As another object of the invention, I provide a means on the yoke for not only taking up slack as it occurs by reason of wear, but for connecting the same to the friction segments so that the yoke will be in a radial plane through the clutch axis regardless of the exact positioning of the point of connection of the segment therewith.

Another object of the invention is to produce a simple, inexpensive device and yet one which will be exceedingly effective for the purposes for which it is designed.

These objects I accomplish by means of such structure and relative arrangement of parts as will fully appear by a perusal of the following specifications and claims.

In the drawings similar characters of reference indicate corresponding parts in the several views.

Figure 1 is an outline elevation of a friction clutch of the type mentioned, showing my improved tightener yoke thereon.

Fig. 2 is a cross-section taken relatively on a line 2—2 of Fig. 1.

Fig. 3 is an enlarged top plan view of the yoke detached.

Fig. 4 is a fragmentary side section of the same.

Referring now more particularly to the characters of reference on the drawings, the numeral 1 denotes the friction wheel, connected to the source of power through the medium of a central sleeve 2 connected thereto, through which sleeve passes a stationary shaft or axle 3.

The wheel 1 has a rim 4 on the inner face of which are adapted to bear a pair of opposed friction segments 5, one end of each of which is pivotally connected to a common arm 6 having a hub or sleeve 7 formed therewith bearing on the shaft and turnable thereon, this sleeve projecting away from the wheel. On the outer end of the sleeve is keyed a pinion 8 adapted to be connected to the member to be driven.

Slidable on the sleeve 7 between the arm 6 and pinion 8 is a friction slide 9 adapted to be moved back and forth by any suitable lever mechanism (not shown).

This slide is provided with ears 10 on its inner face and in opposed alinement, and at right angles to a common diametrical line.

Thus far, the construction outlined is the same as that now had in these clutches, and I do not claim any features of such construction.

My improved yokes which constitute the invention, and which connect the member 9 with the segments 5, each comprises a rectangular cast fork 11 having transverse bosses 12 at its open end, adapted to straddle the ears 10. The bosses are adapted to receive pins or bolts 13 therethrough, which also pass through the ears 10.

The cross bar 14 of the fork, which is relatively thick, is provided with a slotted orifice 15 extending lengthwise of the bar. In this orifice is seated the circular extension 16 of a nut 17, positioned against the inner face of the bar and threaded onto an eye bolt 18 which is pivotally connected at its outer end to ears 5ª on the segment 5 at the end thereof opposite its connection with the arm 6, said pivotal connection being in a plane parallel to the plane of the wheel.

The outer surface of the bar 14 is notched or grooved transversely as shown at 19, adapted to register with the teeth 20 formed on the under side of a washer 21, positioned between the bar and a plain nut 22 on the bolt 18.

The operation of the clutch itself will be evident from a glance at Fig. 2.

When the slide 9 is moved toward the wheel 1, the segments 5 are forced into contact with the rim 4 of the wheel, thus transmitting power through the segments to the arm 6, the sleeve 7, and the pinion 8 thereon. If it is found that the segments do not contact with sufficient force the nuts 17 and 22 are loosened, and the position of the bolt 18 adjusted to suit.

The yoke or fork 11, by reason of its pivotal connection with the ears on the slide, lies in a radial plane through the clutch axis in all positions of adjustment. If it is then found that the eye bolt 18 secured to the segment is not in true alinement with the radial center line of the fork, it is only necessary to clamp the nuts over the slotted hole in the fork-arm through which the bolt passes, to one side or the other of said center line, and the true alinement of the yoke as a whole will be maintained. Owing to the sleeved nut 17 the bolt is strengthened and held against becoming bent at that point, and it also prevents the threads from being chafed and flattened by contact with the hole. The notched washer prevents slippage of the bolt when once secured.

The natural rigidity of the yoke as a whole prevents twisting of the same, and permits of the usual feathers on the sleeve 7 being dispensed with, which not only saves machining and fitting, but makes a more satisfactory device.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination with a shaft, a friction wheel thereon, a friction segment adapted to engage with the wheel, a slide on the shaft adapted to move toward the wheel; a rigid yoke extending substantially radially toward the segment and pivotally secured to the slide on a plane parallel to the plane of the wheel, an eye bolt similarly secured to the segment, and means whereby the bolt may be rigidly secured to the yoke irrespective of the radial alinement thereof with the yoke, while allowing freedom of movement of both about their pivotal connection.

2. In combination with a shaft, a friction wheel thereon, a friction segment adapted to engage with the wheel, a slide on the shaft adapted to move toward the wheel; a rigid yoke extending substantially radially toward the segment and pivotally secured to the slide on a plane parallel to the plane of the wheel, an eye bolt similarly secured to the segment, a cross bar on the yoke having a radial slotted hole extending in a plane parallel to the wheel through which the bolt is adapted to pass, said cross bar being near the segment, and means for clamping the bolt to the bar at any point in the length of the slotted hole.

3. In combination with a shaft, a friction wheel thereon, a friction segment adapted to engage with the wheel, a slide on the shaft adapted to move toward the wheel; a rigid yoke extending substantially radially toward the segment and pivotally secured to the slide on a plane parallel to the plane of the wheel, an eye bolt similarly secured to the segment, a cross bar on the yoke, having a radial slotted hole through which the bolt is adapted to pass, notches cut in the outer face of the bar transversely thereof, a washer on the bolt having teeth adapted to engage with the grooves, and opposed nuts on the bolt adapted to impinge against the inner face of the bar and the outer face of the washer.

In testimony whereof I affix my signature.

EDISON McLEOD.